Patented Mar. 7, 1933

1,900,693

UNITED STATES PATENT OFFICE

COLE COOLIDGE, OF WILMINGTON, DELAWARE, ASSIGNOR TO E. I. DU PONT DE NEMOURS & COMPANY, OF WILMINGTON, DELAWARE, A CORPORATION OF DELAWARE

METAL SALTS OF HALF ACID ESTERS OF FATTY HYDROXYLATED OIL AND PROCESS OF MAKING THEM

No Drawing. Application filed October 7, 1930. Serial No. 487,022.

This invention relates to compounds comprising metal salts of dibasic half acid esters of hydroxylated oils, and more particularly to compounds of this class useful as ingredients in coating compositions.

This invention has as an object the preparation of new metallic ester salts from hydroxylated oils. A further object is the preparation of these salts from castor oil and hydrogenated castor oil. A further object is the production of metal-containing compounds soluble in organic solvents. A still further object is the production of coating compositions, and particularly nitrocellulose coating compositions containing these metallic derivatives.

These objects are accomplished by the following invention in which a polybasic acid, preferably in the form of a dibasic acid anhydride, is reacted with the hydroxylated oil under conditions which cause all, or less than all, of the three hydroxyl groups, to each interact with one molecule of the dibasic acid to produce the half acid ester of each dibasic acid molecule, the hydrogen atom of the remaining carboxyl group of each dibasic acid molecule being then replaced by a metal. The objects of the invention are further accomplished by the incorporation of the compounds so produced into coating compositions as will more fully appear.

Hydroxylated oils, such as castor oil, the triglyceride of ricinoleic acid, or hydrogenated castor oil, the triglyceride of hydroxy stearic acid, by virtue of having a free hydroxyl group in each of the three acid radicals of the triglyceride, can be made to react with a dibasic acid in such proportions as to yield a half-acid ester. This product, containing free carboxyl groups, is according to the present invention, used for the formation of metallic ester salts by replacing the hydrogen atom of the introduced carboxyl groups with a metal.

Thus the hydroxyl group of one or more of the three hydroxy acid radicals, designated as $$\overset{O}{\overset{\|}{.C.R.OH}}$$

in the following formula of the triglyceride or oil,

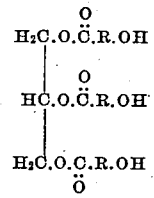

each reacts, under certain conditions, with one molecule of a dibasic acid anhydride to form the half ester of the dibasic acid. One or all of the hydrogen atoms of the three hydroxyl groups, depending upon the proportions of oil and acid used, may be replaced by the acid radical of one carboxyl group of the dibasic acid molecule, and the hydrogen atoms of the free carboxyl group or groups may then be replaced by a metal to yield compounds of the following general formula in which R is the hydrocarbon chain, with attached constituents of a fatty acid; R' is the hydrocarbon group of a dibasic acid radical, and M is a metal.

*I*

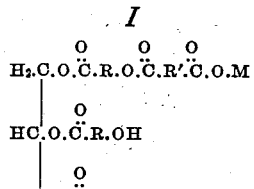

*II*

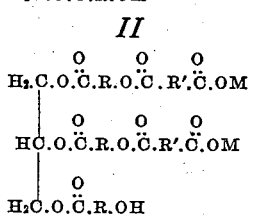

*III*

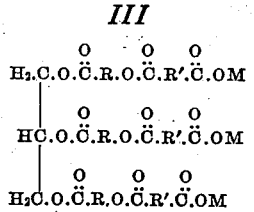

Among the compounds of this class may be noted the metal salts of the castor oil (or hydrogenated castor oil) half acid ester of phthalic acid. The following formula represents the derivative formed when all three of the hydroxyl groups of castor oil each react with a molecule of phthalic anhydride.

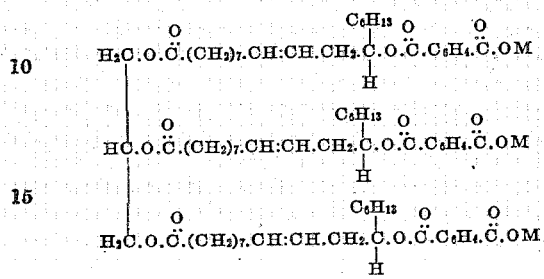

In accordance with the preferred mode of carrying out the invention, I prefer to esterify castor oil, or hydrogenated castor oil, with phthalic anhydride. The reaction is carried out by heating the oil and anhydride for a period of one or two hours. A wide range of temperatures may be used but I prefer to employ a temperature of 140° C. to 150° C. This treatment is sufficient to cause the anhydride to react with the hydroxyl groups in the oil and yet cause practically no direct esterfication of the carboxyl groups through loss of water. The replacement of the hydrogen atom of the carboxyl groups by organic constituents present in the reaction mixture must of course be avoided to any appreciable extent.

The phthalic acid ester is then neutralized in aqueous or alcohol solution with potassium hydroxide to obtain a neutral alkali metal salt which in turn is treated with a water soluble salt of a polyvalent metal to obtain by double decomposition the metal salt of the phthalic half-ester of the castor oil or hydrogenated castor oil. The following examples set forth in detail the preferred method of procedure:

*Example 1*

One hundred forty-eight grams of phthalic anhydride and three hundred sixty-four grams of castor oil are heated together with stirring at 140° C. for one hour. The course of the esterification can be followed by titration of samples with standard alkali, the theoretical neutral equivalent being 512. The product is a yellow-red, gummy resin. It is dissolved in ethyl alcohol and neutralized with a solution of 40 grams of caustic soda dissolved in 400 grams of water. A solution of 90 grams of ferric chloride in 100 grams of water is then added with stirring. The ferric salt of the phthalic half-acid ester of castor oil is formed as a dark red, soft, resinous precipitate. It is best purified by dissolving in a mixture of butyl alcohol and toluol, drying the solution over anhydrous sodium sulfate, and filtering. The material may be kept and used in the form of its solution, or the solid material may be obtained by evaporation of the solvent. In this example all three of the hydroxyl groups are converted into metal phthalate.

The other metal salts are prepared in a similar manner; for example the aluminum, zinc, lead, or ceric salts may be produced by adding aqueous solutions of aluminum nitrate, zinc chloride, lead nitrate, or ceric sulfate, respectively, to the solution of the sodium salt of the castor oil phthalate. These four derivatives are soft, yellow resins. The lead salt is rather unstable in solution unless carefully purified.

*Example 2*

One hundred grams of hydrogenated castor oil and seventy two grams of phthalic anhydride are heated with stirring for one hour at 150° C. The product is a dark red, syrup liquid. It is dissolved in ethyl alcohol, neutralized with sodium hydroxide and treated with a solution of 45 grams of ferric chloride dissolved in 100 grams of water. The ferric salt of hydrogenated castor oil phthalate is precipitated as a soft, red resin. All three of the hydroxyl groups of the hydrogenated castor oil are converted into metal phthalate by this procedure.

The salts of the various metals partake of the color which is characteristic of the metal; the copper salt of hydrogenated castor oil phthalate being blue-green, the aluminum and ceric salts, light yellow, and the cobalt salt, violet. The cobalt derivative is somewhat harder in character than the other above mentioned salts so that solutions of this material form films which dry hard after several days.

The examples specify the exact proportions necessary to produce either the tri- or di-phthalate of the hydrogenated oil. These stoichiometrical proportions need not, however, be adhered to and I may use any quantity of phthalic anhydride up to and including the proportion necessary to react with all of the hydroxyl groups. While castor oil and hydrogenated castor oil are preferred, it is to be understood that other hydroxylated fatty acid glycerides may be used. Thus blown and halogenated castor oil and other derivatives of castor oil may be used. Likewise, drying or semi-drying oils which have been hydroxylated by oxidation processes, such as blown linseed oil, may be converted into a metal blown oil phthalate, or the corresponding derivatives of other dibasic acids, according to the procedure used for castor oil.

I find it preferable to use the anhydride of a polybasic acid, and particularly the anhydride of a dibasic acid rather than the acid itself because of the tendency of all of the carboxyl groups of the acid to react with the oil and form esters, which results in a mixture of substances from which the acid ester is separated with difficulty. It is to be understood, therefore, that the more generic term polybasic acid as used in the claims refers more particularly to the acid anhydride as the preferred form of the acid. It is possible, however, to make the compounds by processes in which the acid is used. The phthalic acid anhydride may be replaced by other dibasic acids or anhydrides such as succinic, malic, maleic, fumaric, adipic, and citric.

All metals which are sufficiently basic to form an organic salt may be used to form the metallic derivatives. The metals I have tested and found to form satisfactory derivatives are copper, magnesium, zinc, cadmium, barium, mercury, aluminum, neodymium, titanium, zirconium, tin, cerium, lead, thorium, vanadium, bismuth, chromium, uranium, manganese, iron, cobalt, and nickel.

I have found that compounds of the present invention are valuable constituents of nitrocellulose lacquers and are also useful as driers for accelerating the oxidation of drying oils.

The compounds of the type herein disclosed are soluble in many organic solvents; for example, ethyl acetate, butyl acetate, and butyl alcohol. They offer, therefore, an advantageous method of incorporating metals with organic materials where they may function, for example, as drying agents in paints and varnishes. These compounds are also lower in cost than metal alkyl phthalates prepared from synthetic alcohols.

I have also discovered that these metal salts are compatible with nitrocellulose and are, therefore, particularly useful when it is desired to intimately incorporate a metal-containing compound with nitrocellulose. For example, the use of these materials provides an excellent means for incorporating into nitrocellulose, metals such as iron, copper, cobalt, vanadium, cerium, and titanium, which are capable of absorbing ultraviolet light and thereby retarding the destructive action of sunlight on lacquer films. As an example of this use of one of the above mentioned organo-metallic compounds, the following composition may be mentioned:

Nitrocellulose_____ 10 parts by weight
Ferric castor oil phthalate_10 parts by weight
Volatile solvent_____ as required Films laid down from nitrocellulose coating compositions prepared in this manner are clear, transparent and unusually desirable. For example, a film of this type applied over an enameled surface showed a life of 320 days as compared with 200 days for a film prepared without the protective agent.

As many apparently widely different embodiments of this invention may be made without departing from the spirit and scope thereof, it is to be understood that I do not limit myself to the specific embodiments thereof except as defined in the appended claims.

I claim:

1. A process which comprises forming an acid ester from a fatty hydroxylated oil and a polybasic acid, and replacing the hydrogens of the free carboxyl groups of the partially esterified polybasic acid with a metal.

2. A process which comprises heating together a dibasic acid and a fatty hydroxylated oil to a temperature sufficient to form the half-acid ester of the dibasic acid, but insufficient to cause esterification of the remaining carboxyl group of the dibasic acid molecule, and replacing the hydrogen atom of the remaining carboxyl group of the dibasic acid molecule with a metal.

3. A process which comprises heating together phthalic anhydride and an oil selected from the group consisting of castor oil and hydrogenated castor oil to a temperature within the approximate range of 140° C. to 150° C., and replacing the hydrogen atom of the free hydroxyl groups with a metal.

4. A process which comprises heating together the anhydride of a dibasic acid and a fatty hydroxylated oil to a temperature sufficient to form the half-acid ester of the dibasic acid corresponding to the anhydride, but insufficient to cause esterification of the remaining carboxyl group of the dibasic acid molecule, neutralizing the product with an alkali metal compound and reacting the product so formed with a water soluble salt of a polyvalent metal.

5. A metal salt of a hydroxylated oil acid ester of a polybasic acid.

6. A metal salt of a hydroxylated oil half-acid ester of a dibasic acid.

7. A metal salt of a hydroxylated oil half-acid ester of phthalic acid.

8. A metal salt of a hydroxylated oil half-acid ester of phthalic acid, the hydroxylated oil being selected from the group consisting of castor oil and hydrogenated castor oil.

9. A metal salt of the castor oil half-acid ester of phthalic acid.

10. A metal salt of the hydrogenated castor oil half-acid ester of phthalic acid.

11. A compound having the following probable formula:

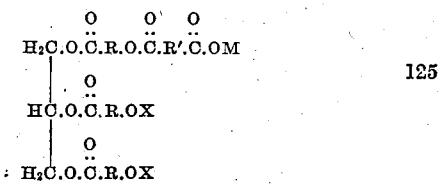

in which R is the hydrocarbon chain, with attached constituents, of a fatty acid; R' is the hydrocarbon group of a dibasic acid radical, M is a metal, and X is a constituent selected from the class consisting of hydrogen and the group

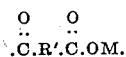

12. A process which comprises forming a half-acid ester from a fatty hydroxylated oil and a dibasic acid, and replacing the hydrogen of the remaining carboxyl group of the dibasic acid with a metal.

13. A process which comprises heating together phthalic anhydride and a fatty hydroxylated oil to a temperature sufficient to form the half-acid ester of the phthalic acid, but insufficient to cause esterification of the remaining carboxyl group of the phthalic acid, and replacing the hydrogen atom of the remaining carboxyl group of the phthalic acid molecule with a metal.

In testimony whereof, I affix my signature.
COLE COOLIDGE.